(12) United States Patent
Fiedler et al.

(10) Patent No.: US 10,110,279 B2
(45) Date of Patent: Oct. 23, 2018

(54) APPARATUS FOR SUPPLYING POWER TO A FIELD DEVICE

(71) Applicant: Endress + Hauser Process Solutions AG, Reinach (CH)

(72) Inventors: Marc Fiedler, Reinach (CH); Reinhard Griech, Weil am Rhein (DE)

(73) Assignee: ENDRESS + HAUSER PROCESS SOLUTIONS AG, Reinach (CH)

( * ) Notice: Subject to any disclaimer, the term of this patent is extended or adjusted under 35 U.S.C. 154(b) by 537 days.

(21) Appl. No.: 14/508,060

(22) Filed: Oct. 7, 2014

(65) Prior Publication Data

US 2016/0099754 A1    Apr. 7, 2016

(51) Int. Cl.
*H04B 5/00* (2006.01)
*H04Q 9/00* (2006.01)

(52) U.S. Cl.
CPC .............. *H04B 5/0037* (2013.01); *H04Q 9/00* (2013.01); *H04Q 2209/88* (2013.01)

(58) Field of Classification Search
CPC ........ H04B 5/0037; H04B 1/16; G05B 11/01; G05B 19/0426; G06F 1/32; H04Q 7/00
USPC ............ 455/343.1; 700/295, 296; 340/539.3; 307/115, 43, 104; 713/300
See application file for complete search history.

(56) References Cited

U.S. PATENT DOCUMENTS

| | | | | |
|---|---|---|---|---|
| 2004/0259533 A1* | 12/2004 | Nixon | ................ | H04W 76/023 455/414.1 |
| 2005/0245291 A1* | 11/2005 | Brown | ............... | G05B 19/4185 455/343.1 |
| 2006/0116102 A1* | 6/2006 | Brown | ............... | G05B 19/4185 455/343.1 |
| 2008/0079318 A1* | 4/2008 | Burr | ..................... | H01H 47/005 307/115 |
| 2008/0274772 A1* | 11/2008 | Nelson | ................ | H05K 7/1462 455/572 |
| 2008/0291009 A1* | 11/2008 | Nelson | ................ | G05B 19/042 340/539.3 |
| 2009/0094466 A1* | 4/2009 | Matthew | .................. | H02J 1/10 713/300 |
| 2010/0013325 A1* | 1/2010 | Vande Vusse | ..... | G05B 19/0423 307/130 |
| 2010/0222895 A1* | 9/2010 | Seiler | ................. | G05B 19/4185 700/16 |
| 2010/0298999 A1* | 11/2010 | Allgaier | ............... | G06F 1/3203 700/296 |
| 2011/0238188 A1* | 9/2011 | Washiro | ............ | G05B 19/0426 700/19 |

(Continued)

*Primary Examiner* — Jared Fureman
*Assistant Examiner* — Joel Barnett
(74) *Attorney, Agent, or Firm* — Bacon & Thomas, PLLC

(57) ABSTRACT

Apparatus for supplying power to a field device, comprising: a first electrical connector adapted to electrically couple a field device to the apparatus, a power supply unit electrically coupled to the first connector and adapted to provide electrical power to a field device via the first connector; a local user input, e.g. a manually operated switch, adapted to be actuated by a user; a monitoring circuitry electrically coupled to the local user input and adapted to detect an actuation of the local user input. The monitoring circuit is adapted to generate an activation signal causing the power supply unit to provide electrical voltage to the first electrical connector for powering a field device electrically coupled to the first connector.

13 Claims, 1 Drawing Sheet

(56) References Cited

U.S. PATENT DOCUMENTS

| | | | |
|---|---|---|---|
| 2013/0009472 A1* | 1/2013 | Orth | G05B 19/042 |
| | | | 307/43 |
| 2013/0082667 A1* | 4/2013 | Sinreich | H02J 1/10 |
| | | | 323/234 |
| 2013/0179697 A1* | 7/2013 | Nicholas | G06F 1/263 |
| | | | 713/300 |
| 2014/0106687 A1* | 4/2014 | Allgaier | H01F 38/14 |
| | | | 455/90.2 |
| 2016/0124408 A1* | 5/2016 | Schauble | G05B 19/0426 |
| | | | 307/112 |

* cited by examiner

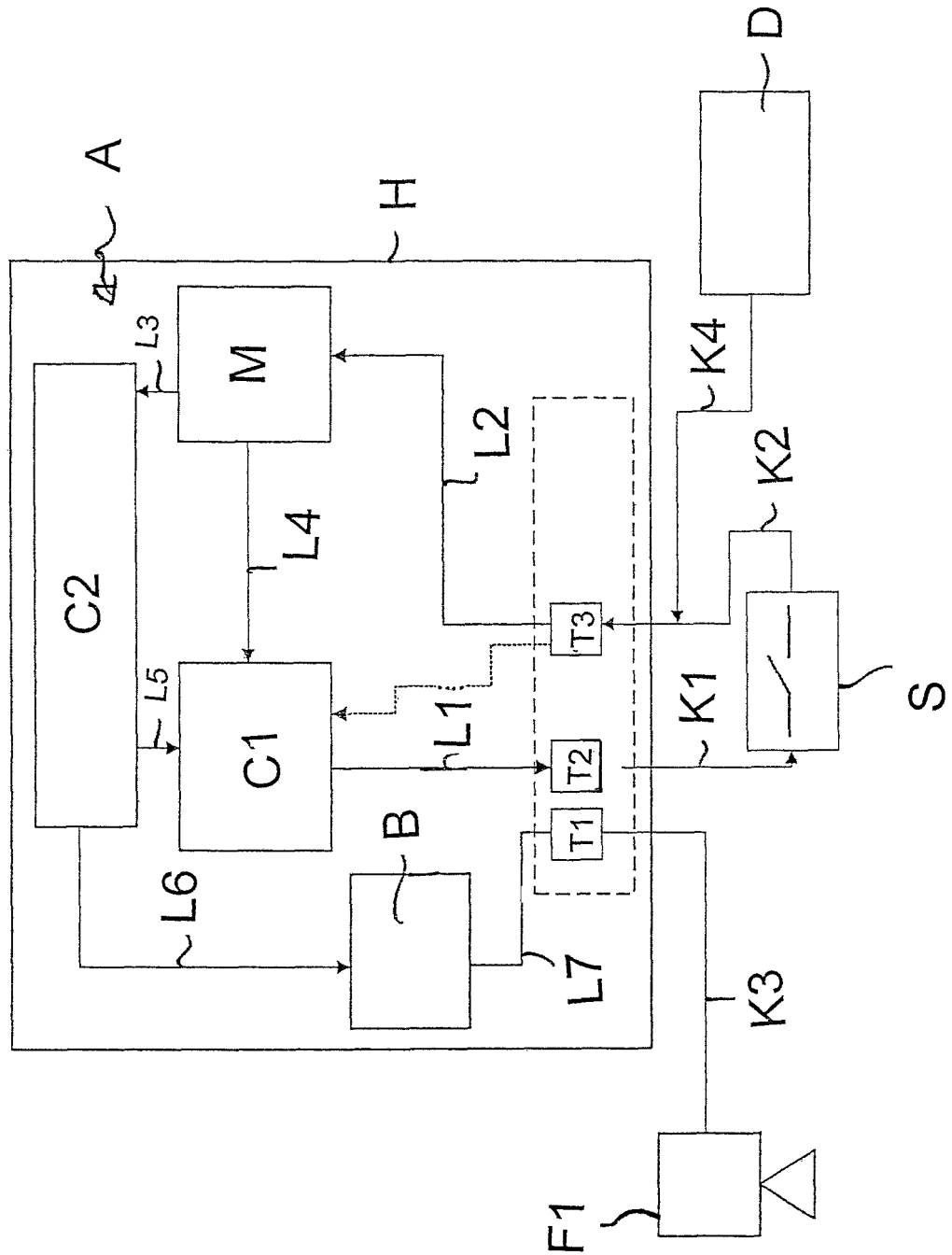

APPARATUS FOR SUPPLYING POWER TO A FIELD DEVICE

TECHNICAL FIELD

The present invention relates to an apparatus for providing power to a field device and a method for supplying power to a field device.

BACKGROUND DISCUSSION

Field devices are used in industrial processes to monitor process variables of the process, or control such process variables. Examples of process variables include pressure, temperature, flow rate, level, etc. Typically, the field devices are located in the "field", away from a central location. For example, such field devices may be scattered throughout an oil refinery or the like. Field devices are used to transmit the measured process variables back to the control room while controllers are used to control the process from the control room.

Typically, communication between the control room and the field device occurs over a two wire process control loop. Example control loops include 4-20 mA process control loops in which a current level through the loop is used to represent a process variable, control loops operating in accordance with the HART® communications protocol, FoundationFieldus protocol, the Profibus protocol, etc. In many configurations, the field device is also powered with electrical power received over the two wire process control loop or over connectors of the field device via which the field device can be coupled to a power source.

Although field devices typically communicate using process control loops, there are situations in which wireless communications is desirable. For example, wireless communication techniques reduce, or eliminate, the wiring which is needed to connect to field devices. In such wireless configuration, there may be no process control loop available to power the field device. Therefore, an alternate power source must be used. For example, in some configurations, the field device is powered using stored power, for example, from a battery, obtained through solar cells, or other techniques. In such configurations, it is desirable to reduce the power consumption required by the field device. In other instances, the device is connected to a wired process control loop but further includes a wireless transceiver for sending or receiving communications. In such configurations, it is useful to conserve power in the device.

Also, it has become known to use a wireless adaptor to power a field device. Such wireless adaptors are described e.g. in published international patent applications WO 2010/018097 A1, US 2005/0245291 A1 and published international patent application WO 2008/150357 A1 which are hereby incorporated by reference.

Field device and wireless adaptor respectively nowadays comprise communication interfaces for communicating with other devices using e.g. one of the above mentioned communication protocols. As mentioned in published international patent application WO 2008/150357 A1 a wake-up circuit can be employed to wake up, i.e. fully power, such a communication interface in case it previously has been in a sleep-mode for conserving energy. For waking up such a communication interface of a field device, or an adaptor a wake-up signal can be employed. This wake-up signal is transmitted to the communication interface from an external device.

Additionally the need has arisen to manually power-up a field device on site e.g. when a measurement value is required and to conserve power, i.e. send the field device in a sleep mode or other power conservation mode when no measurement value is required.

SUMMARY OF THE INVENTION

Hence, an apparatus for supplying power to a field device is proposed, the apparatus comprising: a first electrical connector adapted to electrically couple a field device to the apparatus, a power supply unit electrically coupled to said first connector and adapted to provide electrical power to a field device via said first connector; a local user input, e.g. a manually operated switch, adapted to be actuated by a user; a monitoring circuitry electrically coupled to said local user input and adapted to detect an actuation of the local user input; wherein: the monitoring circuit is adapted to generate an activation signal causing said power supply unit to provide electrical voltage to said first electrical connector for powering a field device electrically coupled to said first connector.

By way of detecting an actuation of the local user input using the monitoring circuitry the functionality of field devices and/or wireless adaptors can be advanced. The monitoring circuitry can hence serve to detect a test signal or wake-up signal not only from an external device but also from the communication circuitry of the apparatus itself.

The local user input can by way of example be a switch, e.g. a button, and the switching status of the switch can be monitored by the monitoring circuit. Especially in explosive zones field devices are installed that are autonomously powered. Hence, the invention proposed can be used to provide power to such autonomous field devices especially in case a measurement value is only required at times when a user is present on site and/or in the vicinity of the field device.

In an advantageous embodiment of the invention the apparatus for supplying power to the field device can be a wireless adaptor with a local user input which can be actuated by a user from the exterior of the adaptor. The power supplied from the apparatus and the wireless adaptor in particular is made available via the electrical connectors by way of a voltage which is present when the local user input has been actuated. The power supplied can e.g. be limited to the requirements for explosive zones, i.e. limited according the Ex or ATEX standard. Preferably the power supplied is matched to the field device attached.

The monitoring circuit may be a circuit separated from the communication circuit but operably coupled to the communication circuit and/or to a controller of the apparatus. The monitoring circuit can e.g. be coupled to a signal output of the communication circuitry. This coupling can be achieved by connecting the signal output of the communication circuit to the monitoring circuit via the local user input. The local user input can serve in that case as a switch. A signal output of the monitoring circuit in turn can be operably coupled to the communication circuit and/or the controller. Hence, a test signal which is transmitted by the signal output of the communication circuitry can be forwarded, depending e.g. on the switch setting of the local user input, which e.g. is a switch or serves as a switch. Such a test signal can serve as a wake-up signal which triggers the monitoring circuitry. For example the monitoring circuitry can transmit an activation signal that causes another circuitry, e.g. the controller, to change its operating mode. The activation signal then triggers the power supply or the controller controlling the power supply to provide an electrical voltage to the connectors.

The power supply can be a photovoltaic cell, a battery, a fuel cell or the like and be either arranged inside the housing of the apparatus or on the outside, e.g. on the surface, of the housing of the apparatus. The controller can also control the voltage present at the connectors by controlling e.g. a boost converter which serves for providing electrical voltage.

The first connector for electrically connecting the field device to the apparatus can e.g. be one or more screw terminals to which a cable can be attached to transmit power to the field device. A field device may hence be coupled to the apparatus. The electrical and/or mechanical coupling between the apparatus and the field device however can also be realized by way of plug connector or a screw fastening.

In an embodiment of the apparatus the apparatus comprises a plurality of electrical connectors and, wherein said power supply unit is coupled to at least the first connector of said plurality of electrical connectors. In case the field device is connected to that first connector, which can e.g. comprise a first and a second electrical contact, an electrical current will flow over that pair of contacts depending on the power consumption of the field device.

In another embodiment of the apparatus the local user input is coupled to a second connector and to a third connector of the plurality of electrical connectors. The second connector can comprise a single electrical contact and the third connector can comprise a single electrical contact. The local user input can thus be electrically connected to the second and the third connector. The second and the third connector can thus be connected to each other via the local user input.

In another embodiment the apparatus comprises a communication circuitry, preferably configured to enable digital communication, which is coupled to said second electric connector. A fieldbus protocol as e.g. HART, Profibus or FoundationFieldbus can be employed for digital communication. The communication circuitry is then enabled to communicate according to a standard fieldbus protocol. The communication circuitry is preferably arranged inside the housing of the apparatus.

In another embodiment of the apparatus the monitoring circuitry is coupled to the third connector. A similar arrangement with a plurality of connectors is described in US patent publication US 2011/134817 A1 which is hereby incorporated by reference. There the connectors are called connection terminals via which e.g. an energy supply unit can be connected or a communication circuitry for digital or analog communication can be connected. Also in the present case the apparatus can comprise more connectors than the mentioned first, second and/or third connector.

In another embodiment the apparatus comprises a housing, inside which housing the monitoring circuitry and the communication circuitry are arranged.

In another embodiment of the apparatus the local user input is arranged outside of the housing and is coupled through the second connector to the communication circuitry and through the third connector to the monitoring circuitry. This allows installing the local user input to an already existing installation comprising said apparatus and a field device connected to the apparatus.

In another embodiment of the apparatus the local user input is configured to forward and/or to block a transmission of a test signal from the communication circuitry to the monitoring circuitry, e.g. in case the local user input is actuated. In order to do so the local user input can possess a function by way of which a user can allow forwarding or blocking the transmission, e.g. by disconnecting the electrical contact between the second and the third connector, of the test signal.

In another embodiment of the apparatus the test signal is a digital communication signal. The test signal can be a digital signal corresponding to a command according to a standard fieldbus protocol. The monitoring circuitry is adapted to detect the test signal. Preferably the monitoring unit is capable of distinguishing the test signal from other signals present on the signal input line of the monitoring circuitry.

In another embodiment of the apparatus the communication circuitry is configured to transmit the test signal in periodic intervals. Thereby the switching status or the actuation of the local user input by the user can continuously monitored. This allows to determination of the switching status of the local user input. The local user input then can be a completely passive element, e.g. a switch or a push-button, which does not require any power supply.

In another embodiment of the apparatus the test signal is a digitally encoded pseudo random noise signal. This ensures that the monitoring circuit does not accidentally activate the power supply of the field device.

In another embodiment of the apparatus the test signal is encoded in a standard fieldbus protocol format, e.g. the HART protocol. Thereby the communication circuitry can be employed to generate the test signal and the monitoring circuitry can be used to detect the encoded test signal. Thus thereby components of the apparatus are used that are present in the apparatus anyway. These components may be the communication circuitry for enabling the apparatus to digitally communicate according to a standard fieldbus protocol and said monitoring circuitry that serves for waking up e.g. the communication circuitry after it has been in a sleep mode.

In another embodiment of the apparatus the monitoring circuitry is coupled to a controller which is configured to operate the apparatus and especially control the power supply of the components of the apparatus and the electrical voltage present at the first connector. The controller can e.g. serve for transmitting and/or receiving information to and from the communication circuitry respectively and to set the communication circuitry and the power supply in respective operating modes depending on information received by the controller, e.g. depending on the activation signal received from the monitoring circuitry.

In another embodiment of the apparatus the controller is configured to provide the electrical voltage from the power supply unit to the first connector of the plurality of electrical connectors upon receipt of the activation signal.

In another embodiment of the apparatus the field device is completely powered with power received from the power supply unit. The power management of the field device is then carried out by the apparatus proposed, especially the controller of the apparatus is then used to manage the electrical power provided to the field device.

In another embodiment of the apparatus the power supply unit comprises a battery.

In another embodiment of the apparatus the power supplied by the power supply unit is limited according to Ex or NEC standard. Thereby the whole arrangement complies with the requirements of the relevant standards regarding safety, e.g. ATEX.

In another embodiment the apparatus is a wireless adapter configured to wirelessly communicate data. A corresponding adaptor comprising a power supply and connectors etc. is disclosed in the already mentioned US patent application US 2011/134817 A1 which is hereby incorporated by reference.

Regarding the method the problem is solved by a method for supplying power to a field device, comprising the steps of: monitoring an actuation of a local user input and detecting an actuation of the local user input, Generating an activation signal upon actuation of the local user input, and providing an electrical voltage to power the field device via a first electrical connector of the apparatus. Preferably, the actuation signal causes the power supply unit, which is e.g. integrated in the apparatus, to provide electrical power to said field device via the first electrical connector. The electrical power can be supplied to a field device which is electrically coupled to the apparatus via a first electrical connector. The apparatus can possess a plurality of electrical connectors, e.g. corresponding to the connectors disclosed in US application 2011/134817 A1 mentioned above.

In an embodiment the method comprises the step of attaching the local input to the apparatus. The local user input can be electrically coupled to the apparatus via a second and a third connector which is provided for at the apparatus.

An arrangement can then comprise an apparatus according to one of the above mentioned embodiments and a field device which is electrically coupled to the apparatus. The arrangement can further comprise a local user input, that is attached to the apparatus. The apparatus can comprise a power supply unit, which power supply unit is coupled to a plurality of electrical connectors, preferably to the first connector.

In an embodiment the method comprises the step of generating a, preferably digital, test signal by way of a communication circuitry of the apparatus, and receiving the test signal by a monitoring circuit of the apparatus and, thereby detecting an actuation of the local user input. The monitoring circuitry can subsequently generate the activation signal for activating the power supply unit. The activation signal can be processed by a controller which controls the activation of the power supply and hence the voltage present at the first connector to which a field device is coupleable.

In an embodiment the method comprises the step of forwarding or blocking a transmission of the test signal via the local user input, e.g. depending on the actuation of the local user input.

BRIEF DESCRIPTION OF THE DRAWING

FIG. 1: shows a simplified block diagram of an arrangement comprising an apparatus A for powering a field device F1 which field device F1 is coupled to the apparatus A and a local user input S which is also coupled to the apparatus A.

DETAILED DISCUSSION IN CONJUNCTION WITH THE DRAWING

FIG. 1 shows a block diagram of an apparatus A for supplying power to a field device F1. The apparatus A can very well be a wireless adaptor which is coupleable to the field device F1. The apparatus A may also be another field device, e.g. a measurement transmitter feeding device, also known as isolation amplifier. In case of a wireless adaptor, the apparatus A also comprises a wireless communication circuit—not shown- and/or an antenna for transmitting information wirelessly. Wireless communication circuitry and/or antenna could in such a case be coupled e.g. to a controller C2 which is adapted to manage operation and especially power supply of the apparatus A.

The apparatus A comprises a power supply B, e.g. a battery, which could as well be any other power supply which preferably enables an autarkic, i.e. independent of any wired power supply, as for example a mains power supply, operation of the apparatus. The apparatus A further comprises a communication circuitry C1, e.g. a HART-Modem, a monitoring circuitry M which serves for detecting a signal, e.g. a test signal, on line L2. The apparatus A may as well comprise other electric or electrical components. The apparatus A and its components are preferably solely powered by the power supply B.

The apparatus A can preferably be operated in different operating modes, wherein in a first operating mode the communication circuitry C1 is adapted to generate the test signal, e.g. in regular intervals, for example every 10 seconds. The test signal is then forwarded via line L1 to connector T2, and line K2 to local user input S. The local user input S may by way of example be removably attached to the apparatus A or operably coupled, e.g. via wires, to the apparatus A. Thus by way of the local user input S it is possible to feedback said test signal and/or to block feedback of said test signal generated by the communication circuitry C1.

The local user input S may be adapted to forward or to block the test signal by actuation of the local user input S by a user. In case the local user input S is configured to forward the test signal, the test signal is transmitted over line K2 to connector T3 and then over Line L2 to the monitoring circuitry M. Otherwise the test signal generated by the communication circuitry C1 is blocked by the local user input S. The local user input S can be realized by a switch or a pushbutton with two switch settings.

During this operating mode the communication circuitry C1 serves for generating and transmitting a predetermined test signal. However, during another operating mode of the apparatus A and the communication circuitry C1 respectively, the communication circuitry C1 can be adapted to transmit and receive regular communication signals, e.g. according to a standard fieldbus protocol, via connectors T2 and/or T3. Hence the communication circuitry C1 may serve for data exchange with an external device, e.g. a control device D or even another field device—not shown. The signaling path for data exchange comprises the dashed line in FIG. 1 connecting the connector T3 with the communication circuitry C1 and line L1 connecting connector T2 with the communication circuitry C1.

It is also possible to couple an external device D e.g. via line K4 to connector T3. Through this external device D a test signal can be generated by the device D and can be transmitted to the monitoring circuitry M in order to wake-up the apparatus A and/or the field device F1 respectively. The test signal or wake-up signal then serves for changes the operating state of the apparatus A and as a consequence the operating state of the field device F1.

Upon reception of the test signal, which preferably is a predefined digital communication signal, the monitoring circuitry causes the communication circuitry and/or the controller to leave a preceding operating mode, e.g. a sleep mode, and enter another operating mode, which e.g. allows power supply to the field device F1 connectable to connector T1. This is preferably achieved by transmitting an activation signal to the controller C2 via line L3 or to the communication circuitry via line L4. The test signal serves as a detection signal or wake-up signal for the apparatus A and the field device F1 respectively.

Upon reception of the activation signal the controller C2 manages the power or the voltage present at connector T1. This can e.g. be done by controlling a boost converter which is connected to the battery B and the connector T1. Hence, an electrical power, e.g. an electrical voltage which serves for operating the field device F1, which is attached to connector T1, is made available at connector T1.

The connectors T1, T2, T3 are preferably arranged inside a housing H of the apparatus A. However the connectors T1, T2, T3 can as well be arranged in a way that they are accessible from the exterior of the apparatus A.

When a voltage is present at connector T1 and the field device is connected to said connector T1 via line K3 the field device F1 may receive the power supplied from the power supply B and starts up, i.e. enters an operating mode. During this operating mode the field device F1 is able to perform its predetermined functions, which can e.g. comprise acquiring, transmitting and/or presenting a measurement value. The measurement value can for example be displayed on a local display of the field device.

By way of the invention an apparatus A is provided which serves for switching on and/or off a field device F1 when demanded. This can e.g. be the case is when a measurement value of a field device F1 connected to the apparatus A is necessary. A user can accordingly actuate the local user input S which is e.g. attached to the apparatus A or operably coupled to the communication circuitry C1 and the monitoring circuitry M of the apparatus A and cause the field device F1 to be powered or to be switched off. Thus it is possible to active a field device F1 and thereupon receive a measurement value from the field device F1 when demanded. The field device F1 may be a sensor or any other component which serves for generating, transmitting, receiving, or displaying process related data.

The invention claimed is:

1. An apparatus for supplying power to a field device, wherein the apparatus is a wireless adaptor, comprising:
    a housing, inside which housing a power supply unit, a monitoring circuit and a communication circuit are arranged;
    a first electrical connector adapted to electrically couple said field device to the apparatus;
    said power supply unit is electrically coupled to said first electrical connector and adapted to provide electrical power to said field device via said first electrical connector;
    a local user input adapted to be actuated by a user arranged outside of said housing;
    said monitoring circuit is electrically coupled to said local user input; and
    said communication circuit is electrically coupled to said local user input and configured to enable digital communication; wherein:
    said communication circuit is configured to send a test signal in periodic intervals;
    said local user input is configured to forward and/or to block a transmission of said test signal from said communication circuit to said monitoring circuit in case the local user input is actuated, and
    said monitoring circuit is adapted to generate an activation signal upon reception of said test signal, causing said power supply unit to provide electrical voltage to said first electrical connector for powering said field device electrically coupled to said first electrical connector.

2. The apparatus according to claim 1, wherein:
    a plurality of electrical connectors are provided; and
    said power supply unit is coupled to said first electrical connector of said plurality of electrical connectors.

3. The apparatus according claim 2, wherein:
    said local user input is coupled to a second electrical connector and to a third electrical connector of said plurality of electrical connectors.

4. The apparatus according to claim 1, wherein:
    said monitoring circuit is coupled to said third electrical connector.

5. The apparatus according to claim 1, wherein:
    said local user input is coupled through said first and second electrical connectors to said communication circuit and through said third electrical connector to said monitoring circuit.

6. The apparatus according to claim 1, wherein said test signal is a digital communication signal.

7. The apparatus according to claim 1, wherein:
    said test signal is encoded in a standard fieldbus protocol format, the HART protocol.

8. The apparatus according to claim 1, wherein:
    said monitoring circuit is coupled to a controller which is configured to operate the apparatus.

9. The apparatus according to claim 8, wherein:
    said controller is configured to provide said electrical voltage from said power supply unit to said first connector of said plurality of electrical connectors upon receipt of said activation signal.

10. The apparatus according to claim 1, wherein:
    said power supply unit is a battery.

11. The apparatus according to claim 1, wherein:
    the power supplied by said power supply unit is limited according to Ex or NEC standard.

12. The apparatus according to claim 1, which apparatus is a wireless adapter configured to wirelessly communicate data.

13. A method for supplying power to a field device, comprising the steps of:
    electrically coupling at least one field device to an apparatus which is a wireless adaptor and which comprises a housing, inside which housing a power supply unit, a monitoring circuit and a communication circuit are arranged;
    wherein a first electrical connector adapted to electrically couple said field device to the apparatus;
    wherein said power supply unit is electrically coupled to said first electrical connector and adapted to provide electrical power to said field device via said first electrical connector;
    wherein a local user input adapted to be actuated by a user arranged outside of said housing;
    wherein said monitoring circuit is electrically coupled to said local user input; and
    wherein said communication circuit is electrically coupled to said local user input and configured to enable digital communication;
    sending a test signal in periodic intervals by the communication circuit; forwarding and/or to blocking a transmission of said test signal from said communication circuit to said monitoring circuit in case the local user input is actuated by said local user input, and
    generating an activation signal by said monitoring circuit upon reception of said test signal, causing said power supply unit to provide electrical voltage to said first electrical connector for powering said field device electrically coupled to said first electrical connector.

* * * * *